US008798614B2

(12) United States Patent  
Bellovin

(10) Patent No.: US 8,798,614 B2
(45) Date of Patent: *Aug. 5, 2014

(54) ENHANCED COMMUNICATION SERVICE FOR PREDICTING AND HANDLING COMMUNICATION INTERRUPTION

(75) Inventor: Steven Michael Bellovin, Westfield, NJ (US)

(73) Assignee: AT&T Mobility II LLC, Atlanta, GA (US)

( * ) Notice: Subject to any disclaimer, the term of this patent is extended or adjusted under 35 U.S.C. 154(b) by 173 days.

This patent is subject to a terminal disclaimer.

(21) Appl. No.: 12/691,447

(22) Filed: Jan. 21, 2010

(65) Prior Publication Data

US 2010/0120414 A1    May 13, 2010

Related U.S. Application Data

(63) Continuation of application No. 09/900,773, filed on Jul. 6, 2001, now Pat. No. 7,676,224.

(51) Int. Cl.  
*H04W 24/00* (2009.01)

(52) U.S. Cl.  
USPC .......................... 455/423; 455/404.2; 370/328

(58) Field of Classification Search  
CPC ...................................................... H04B 7/024  
USPC .............. 455/456.1, 423, 421, 424, 425, 428, 455/422.1, 426.1; 370/328; 379/67.1, 1.03, 379/22.03, 10.03, 27.04; 340/988, 991, 992  
See application file for complete search history.

(56) References Cited

U.S. PATENT DOCUMENTS

| 4,811,380 | A |   | 3/1989  | Spear |
| 5,146,472 | A |   | 9/1992  | Hallman |
| 5,442,679 | A |   | 8/1995  | Regis et al. |
| 5,590,177 | A |   | 12/1996 | Vilmur et al. |
| 5,896,567 | A | * | 4/1999  | Ogushi .......................... 455/421 |
| 5,926,767 | A |   | 7/1999  | Olds et al. |
| 5,995,830 | A | * | 11/1999 | Amin et al. .................... 455/423 |
| 6,018,655 | A |   | 1/2000  | Bartle et al. |
| 6,038,444 | A | * | 3/2000  | Schipper et al. .............. 455/421 |
| 6,047,280 | A |   | 4/2000  | Ashby et al. |
| 6,067,457 | A |   | 5/2000  | Erickson et al. |
| 6,119,005 | A |   | 9/2000  | Smolik |
| 6,181,943 | B1 |   | 1/2001  | Kuo et al. |
| 6,188,905 | B1 |   | 2/2001  | Rudrapatna et al. |
| 6,192,240 | B1 |   | 2/2001  | Tayloe et al. |
| 6,317,596 | B1 |   | 11/2001 | Elwin |

(Continued)

*Primary Examiner* — Nay A Maung  
*Assistant Examiner* — Angelica M Perez  
(74) *Attorney, Agent, or Firm* — Amin, Turocy & Watson, LLP

(57) ABSTRACT

A method and apparatus for anticipating communication interruption. If, during an established call between two communication devices, a telecommunication device determines that a communication link to one of the devices will be interrupted, either temporarily or permanently, the device predicts the interruption in the communication link. The device may send a message, as pre-determined by at least one of the communication device, to the communication device of the predicted or pending call drop or interruption. After the interruption the previously established call is resumed. If a reconnection attempt is appropriate, then the device will attempt to reconnect to the dropped device. If a reconnection attempt is not appropriate, or if the reconnection attempt is unsuccessful, the non-dropped communication device is connected, as predetermined by either of the communication devices, to an appropriate connection, such as, to a voice mail. If the reconnection attempt is successful, the call between the two communication devices is re-established.

20 Claims, 2 Drawing Sheets

(56) References Cited

U.S. PATENT DOCUMENTS

| | | |
|---|---|---|
| 6,343,216 B1 | 1/2002 | Kim et al. |
| 6,349,206 B1 | 2/2002 | Reichelt et al. |
| 6,442,507 B1 | 8/2002 | Skidmore et al. |
| 6,594,485 B1 * | 7/2003 | Ezaki .......................... 455/417 |
| 6,597,906 B1 | 7/2003 | Van Leeuwen et al. |
| 6,721,572 B1 * | 4/2004 | Smith et al. ................ 455/456.1 |
| 7,676,224 B1 * | 3/2010 | Bellovin ....................... 455/423 |
| 7,769,364 B2 * | 8/2010 | Logan et al. .................. 455/413 |
| 7,904,516 B2 * | 3/2011 | Chern .......................... 709/206 |
| 8,099,046 B2 * | 1/2012 | Helferich .................... 455/41.2 |

* cited by examiner

ENHANCED COMMUNICATION SERVICE FOR PREDICTING AND HANDLING COMMUNICATION INTERRUPTION

CROSS REFERENCE TO RELATED APPLICATIONS

This application is a continuation of U.S. patent application Ser. No. 09/900,773 entitled "ENHANCED COMMUNICATION SERVICE FOR PREDICTING AND HANDLING COMMUNICATION INTERRUPTION" filed Jul. 6, 2001, the entirety of which is incorporated by reference herein.

TECHNICAL FIELD

The present invention discloses an enhanced communication service for handling communication interruption, and more particularly discloses an enhanced cellular service for predicting and handling call interruption issues.

BACKGROUND OF THE INVENTION

Today's cellular systems are plagued by dropped calls, especially when drivers enter dead spots. Generally, a "dead spot" is a geographic area of coverage in a cellular system in which for one reason or another cellular resources are insufficient to handle subscriber demand. Many of these call drops are predictable—carriers know where they don't have adequate coverage, or where coverage is interrupted by hills, tunnels, buildings, etc. But that means that the cellular operator will often know that a call is likely to drop. This is especially true with the enhanced location service that some carriers and service providers are looking at deploying.

Although current telecommunication systems are generally highly reliable, there are occasions in which an established telephone call between two devices will be prematurely dropped. In a wired telecommunication system established calls are dropped very infrequently.

However, in a wireless telecommunication system, such as a cellular telephone system, established telephone calls are dropped somewhat more often than in the wired system. There are a number of reasons why a telephone call with a wireless telephone may be dropped prematurely. One reason for dropped calls is that the wireless telephone has left the coverage area of the wireless system. As is well known, cellular telephone systems are divided into cells, each of which is served by a base station which communicates with wireless telephones (i.e., mobile telephones) located within the cell. All the cells together make up the coverage area of the cellular system. If a mobile telephone travels outside the coverage area, the wireless communication channel between the mobile telephone and the wireless system will be lost and the call will be dropped. In some situations the mobile telephone may be entering the coverage area of another cellular service provider. In such a case, the call may continue only if the mobile telephone has roaming privileges in that other cellular system.

Another reason that an established call may be dropped in a cellular system is due to handoff. As is well known, when a mobile telephone travels from one cell to another cell, the call is handed off from the base station serving the one cell to the base station serving the other cell. However, in some situations the base station serving the other cell may not have any radio channels available for communication with the mobile telephone at the time of the handoff. In such a situation the established call with the mobile telephone will be dropped.

Still another reason for dropped calls in a cellular system is coverage holes, which are areas in the geographic serving area which do not receive signals from the system for some reason. Such coverage holes include both indoor and outdoor areas. If a mobile telephone enters a coverage hole where coverage is not available, radio communication with the serving base station will be lost and the call will be dropped. However, calls in a cellular system may also be dropped due to RF interference and equipment failures.

Dropped calls are very inconvenient to callers. Re-establishment of the call is left to the parties to the call and neither party knows the intention of the other party. This may result in both parties attempting to call the other party, which may result in the connection being blocked. Alternatively, both parties may assume that the other party is going to initiate the call, resulting in no re-establishment of the call. The dropped call situation is even worsened when there is no indication to either party for the reason of the dropped call.

These dropped calls often result in the parties not being able to fully communicate with each other. It also results in loss of revenue to the service providers when the cellular system is not in use due to premature termination of an established call.

Thus there is a need for an improved method and apparatus for anticipating call interruption in a telecommunication network.

SUMMARY OF THE INVENTION

The present invention provides an improved system and method for anticipating calls interruption in a communication network. In accordance with the invention, if it is determined during an established call between at least two communication devices that a connection to one of the devices is predicted or anticipated to be temporarily interrupted or dropped, then prior to the interruption or drop-off a message may be sent to at least one other communication device indicating that the connection to the one device will be temporarily dropped or interrupted. The message may include the reason that the connection will be temporarily interrupted or dropped.

In accordance with another aspect of the invention, in addition to the message, the interrupted call will be re-established between the at least two communication devices upon reaching a connectable location.

In accordance with yet another aspect of the invention, in addition to the message, the system may determine that an attempt to reconnect the dropped communication device is appropriate upon reaching a connectable location. In accordance with this aspect of the invention, the system will attempt to reconnect the dropped communication device upon reaching the connectable location. If the reconnection attempt is successful, the system will re-establish the call between the at least two communication devices. In addition, the system may send a reconnection indication to at least one of the communication devices to indicate that the call has been re-established.

If it is determined that an attempt to reconnect the dropped call between the at least two communication devices is not appropriate, or if the attempt to reconnect the dropped communication is unsuccessful, then the other communication device, which is still connected to the system, may be routed to another medium, such as, a voice mail, so that the user of the still connected communication device can leave a message for the user of the dropped communication device.

In one advantageous embodiment, the interrupted or dropped communication device is a wireless telephone in communication with a wireless cellular network via a wireless communication link and the steps of the invention are carried out with the help of at least one intelligent electronic device.

In another advantageous embodiment, the interrupted or dropped communication device is a wireless telephone in communication with a wireless cellular network via a wireless communication link and the steps of the invention are carried out by a wireless network.

Thus, the present invention provides an improved system and method for anticipating interrupted telephone calls which provides more information to the users of the system and which increases the chances that communication between the users can continue after the temporary interruption, either through the continuation of the call or re-establishment of the call or via other electronic communication mediums.

These and other advantages of the invention will be apparent to those of ordinary skill in the art by reference to the following detailed description and the accompanying drawings.

DETAILED DESCRIPTION

Figure 1A:
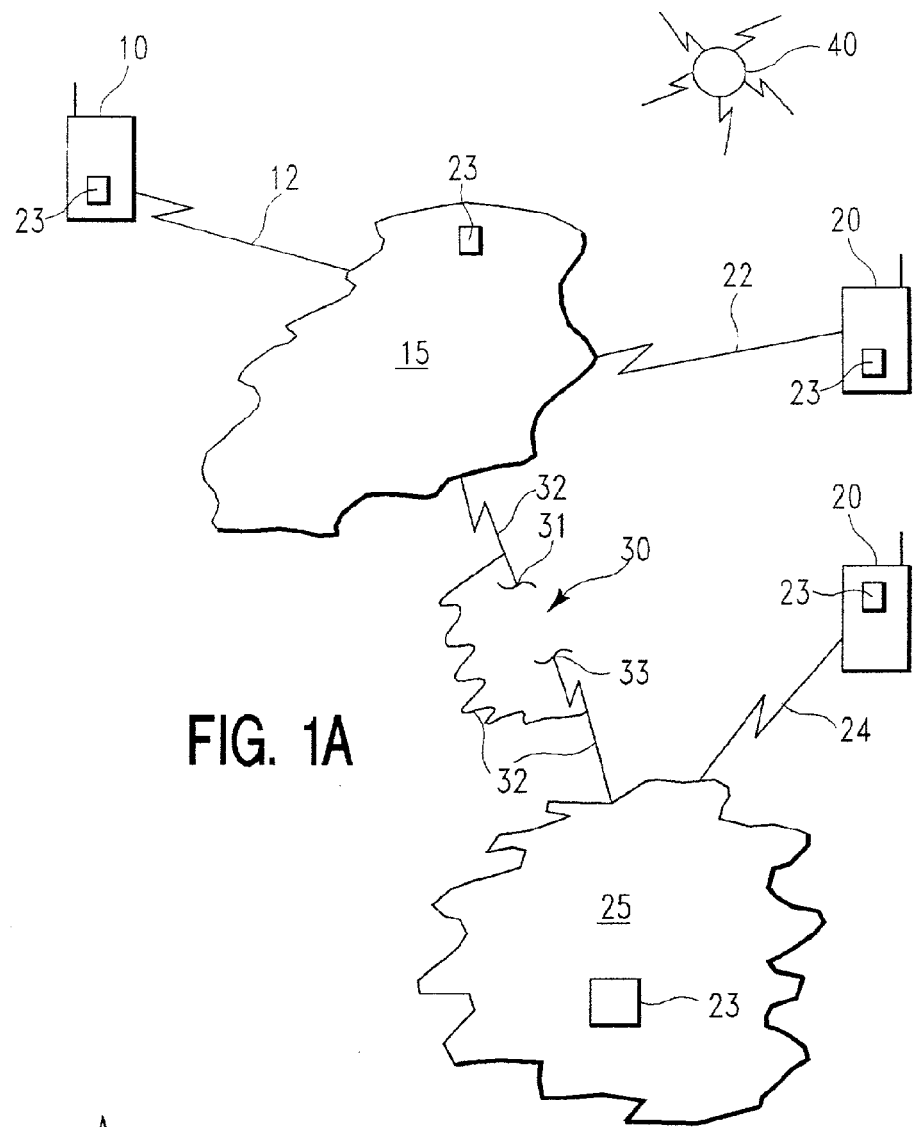
FIG. 1A illustrates a communication network between at least two communication devices using the present invention.

FIG. 1A illustrate a communication network between at least two communication devices using the present invention. Communication devices 10 and 20 have established communication via communication channel or links 12 and 22, respectively, through at least one communication network 15. The communication devices 10 and 20 may be a landline telephone, a wireless phone, a cellular phone, a PDA (personal digital assistant), a mobile communication device, a computer, to name a few. For the ease of describing this invention the communication devices 10 and 20 will be referred to as cell phone or subscriber terminal 10 and 20.

Once the communication has been established between the cell phone 10 and 20 the communication will continue until terminated by one of the parties. However, as discussed earlier, for a number of reasons the communication between cell phones 10 and 20 is prematurely interrupted. To illustrate this point, FIG. 1 shows that the cell phone 10 has remained stationary and has continued the established communication link 12 with the communication network 15, while the cell phone 20 has moved from network 15 (via communication link 22), to at least a second communication network 25 via communication link 24.

As the cell phone 20 moves from network 15 to network 25 there is a call drop area or zone 30. Thus in this communication network there are call drop/pick-up points 31 and 33 at either side of the call drop zone 30. Therefore, when moving from network 15 to network 25 the communication between cell phones 10 and 20 would continue unabated on a communication link/channel 32 until call drop point 31, with no communication in zone 30, and the communication would resume at call pick-up point 33 via the communication link/channel 32.

However, the reverse would be true also, i.e., the cell phone 20 could be communicating with the cell phone 10 through networks 25 and 15, and then moves into the network 15 area. Thus in this case point 33 would be the call drop point 33, while point 31 would become the call pick-up point 31.

With the advancement of technology there are now many systems available that can see or predict the call drop area or zone 30. One example of such a system is a GPS (Global Positioning Satellite) 40. Provision of GPS equipment within subscriber terminals 10, 20, per se, is well-known.

Communication networks 15 and 25 may each include the Public Switched Telephone Network (PSTN), which is a landline network, and/or a wireless cellular network. For the ease of understanding, only two networks 15 and 25 have been shown, however, in a normal communication link between devices 10 and 20 there are many such communication networks 15 and/or 25.

It should also be appreciated that the call drop/interruption zone 30 could be within the network 15 without the device 20 even leaving the network 15. Similarly, the call drop/interruption zone 30 could be due to the device 10 being in an area creating the call drop/interruption zone 30 without the device 20 even leaving the network 15.

Another feature of this invention is an intelligent electronic device 23. The intelligent electronic device 23 of this invention predicts a call interruption and acts as programmed or pre-determined by the user. For the purpose of illustration the intelligent electronic device 23 is shown at a number of locations. However, in order to practice this invention one needs only one intelligent electronic device 23 in the entire communication system, but each device or network could have at least one intelligent electronic device 23.

Returning to FIG. 1A, when the cell phone communication link reaches point 31 or 33 the system knows that the communication link 32 will be temporarily interrupted. However, if either of the cell phone is disconnected prior to reaching the call resumption point the communication link will then be permanently severed. Thus knowing that the presently established cell phone call will be interrupted in the call drop zone 30, the intelligent electronic device 23 will predict the interruption and act as pre-determined or as programmed.

Figure 1B:
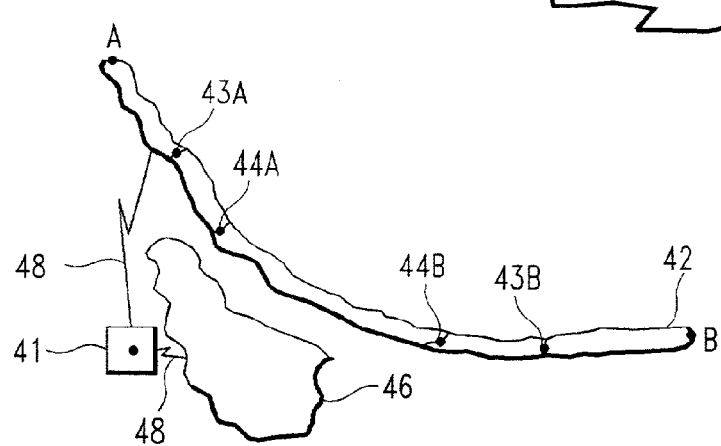
FIG. 1B illustrates an example of an interruption in the communication network as illustrated in FIG. 1A between the at least two communication devices.

FIG. 1B illustrates an example of an interruption in the communication network as illustrated in FIG. 1A between the at least two communication devices. In this example a person may be travelling on a road 42 between point A to point B or vice versa. The cellular service provider has a cell site antenna 41 which transmits and receives communication using a signal 48, however, there is an obstruction 46, such as, a hill 46, a building 46, to name a few, which blocks a portion of the signal 48 and prevents a portion of the signal 48 from reaching the area between points 44A and 44B on the road 42. The signal 48 however reaches at all points along the road 42, except for the region between points 44A and 44B. Thus it is predictable that there would be no communication coverage on the road 42 between points 44A and 44B. Knowing this information the electronic device 23 at point 43A, if the device is moving from point A to B, will announce the impending interruption between points 44A and 44B. After crossing point 44B the connectivity will be restored at point 44B and the communication would be resumed. However, once the connectivity point 44B has been crossed and no communication between the devices has been established then the electronic device 23 would either try to re-establish the communication link or will send a message to the other device or will permanently terminate the communication.

However, if the communication device is moving from point B to point A, on the road 42 then the electronic device 23 at point 43B, will announce the impending interruption between point 44B and point 44A. After crossing point 44A the connectivity will be restored at point 44A and the communication would be resumed. However, once the connectivity point 44A has been crossed and no communication between the devices has been established then the electronic device 23 would either try to re-establish the communication link or will send a message to the other device or will permanently terminate the communication.

Thus points 43A and 43B can be called prediction points, while area between points 44A and 44B can be called as "no coverage zone" or "dead zone" or "drop-off area", etc. These prediction points 43A and 43B can be pre-determined by the manufacturer of the electronic device 23, or these prediction points 43A and 43B can be adjusted or programmed by the subscriber, or these prediction points 43A and 43B can be determined by any of the components within the communication network. For example, these prediction points 43A and 43B can be lets say one mile prior to the interruption point 44A or 44B or these prediction points 43A and 43B can be lets say 30 seconds prior to the interruption point 44A or 44B or these prediction points 43A and 43B can be set based on any reasonable criteria prior to the interruption point 44A or 44B. The calculations used to determine the prediction points 43A and 43B can be based on the speed of the moving vehicle, the topographical conditions, the environmental conditions, the strength or weakness of the cellular signal, to name a few.

The phenomena that causes dead spots or drop-off areas is known, however, with this invention a system, such as, a cellular system, can predict these dead spots and plan accordingly. Preferably, the electronic device 23 will have the capability of analyzing and predicting the drop-off areas, however, the electronic device 23 could be integrated into a system or a process to analyze and predict the drop-off areas. The prediction of communication interruption can be based on a number of factors, such as, the use of historical data, geographical data, enhanced location data, topographical data and GPS (Global Positioning Satellite). For example, historical data can be created by the service provider when the service provider is aware of no coverage zones and that information can be made available to a device seeking this information. The historical data could be created by the device itself by analyzing the path the user is following and recording drop-off zones. Geographical data will be created by the use of geography of the area, such as, building, tunnels, and other structures that may create drop-off zones. The enhanced location data could be created by the service provider when suddenly the service providers finds that no coverage is available in a certain area and upon analysis it is determined that there is an equipment failure in that area or that there is some RF interference creating the drop-off zone or that mobile switching center (MSC) error is causing the dead zone. The enhanced location data could also be created, such as, by the service provider by monitoring the communication traffic patterns and finding no coverage areas. This information would then be made available to the device seeking such data. Thus the enhanced location services provide high-accuracy real-time data. Topographical data will be created by the use of topology of the area, such as, hills, valleys, to name a few. GPS (Global Positioning Satellite) can be used to monitor communication traffic flow patterns, topology, or similar other factors that contribute to the no coverage zones and providing this information to the device seeking this information. The device can also be placed in a learning mode, i.e., the device will remain in an active mode seeking communication interruption regions.

The communication interruption can be based on a number of factors, such as, a tunnel blocking the communication, a hill obstructing the communication, an indoor feature obstructing the communication, an outdoor feature obstructing the communication, lack of communication coverage by at least one cell tower, a communication frequency not available, a hand-off between at least two cell towers not available, handoff to a cell with insufficient communication channels, traveling outside the coverage area, an area with a coverage hole, a mobile switching center (MSC) error, interference from an RF source and equipment failures, to name a few.

The intelligent electronic device 23 can be a part of the communication device 10 and/or 20, or a part of the network 15 and/or 25. The intelligent electronic device 23 can also be a processor. The intelligent electronic device could even reside in the mobile switching center (MSC) or base station (BS).

The user of the communication device at either end of the call can be notified by either the cell system or by their phone using the intelligent device 23. The interrupted calls will either be carried over or automatically redialed, the latter is either by the cell phone or the network.

The protocol of the wireless communication channels or links may be, for example, the air interface described by TIA/EIA Interim Standard IS-136.1, 800 MHz TDMA Cellular—Radio Interface—Mobile Station—Base Station Compatibility—Digital Control Channel, December 1994, Telecommunications Industry Association (hereinafter "IS-136"), which is incorporated herein by reference.

Furthermore, this invention can also be used in conjunction with wireless data networks, including local area networks such as those using IEEE Standard 802.11.

Figure 2:
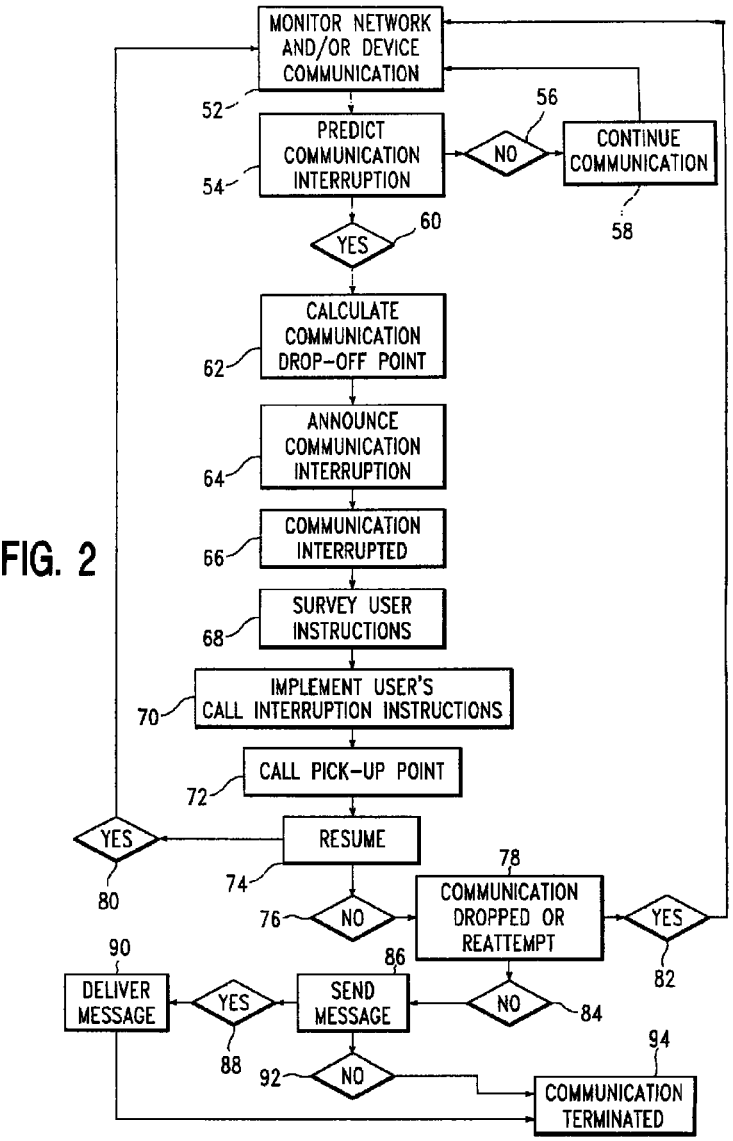
FIG. 2 is a flow diagram showing the steps to be performed in accordance with this invention.

FIG. 2 is a flow diagram showing the steps to be performed in accordance with an embodiment of the present invention. At step 52 the intelligent electronic device 23 will monitor network and/or device communication. While monitoring at step 54 it will predict communication drop-off. If the person has changed direction or there is no drop-off at step 56 then the communication will continue at step 58 and the intelligent electronic device 23 will continue monitoring the network and/or device communication at step 52. However, if a communication drop-off is imminent and the answer is "yes" at step 60 then the intelligent electronic device 23, at step 62 will calculate the communication drop-off point 31 or 33. At step 64 the intelligent electronic device 23 will announce the communication drop-off. At step 66 the call drop-off will occur. At step 68 the intelligent electronic device 23 will survey users' instructions which are either predetermined or pre-programmed. At step 70 the intelligent electronic device 23 will implement user call drop instructions. At call pick-up or resume point 72 the communication between cell phones 10 and 20 will either be re-established or the intelligent electronic device 23 will communicate the predetermined or pre-programmed instructions to either or both of the parties.

If the call is resumed at step 74 then via step 80 the intelligent electronic device 23 will continue monitoring the network and/or device communication from step 52. However, if at step 76 the call has been permanently terminated then at step 78 the communication between the cell phones 10 and 20 will be terminated. If in step 78 it is determined that reconnection attempt is to be made and is successful at step 82, then the communication links between the devices 10 and 20 will be reestablished and the monitoring will continue at step 52 of the network and/or the device. However, if at step 78 it is determined that the attempts to reconnect for certain number of attempts, or if reconnection is not made within a number of attempts, the reconnection attempt is deemed unsuccessful then at step 84 the communication would be routed to the electronic device 23 to determine the user pre-programmed preferences, such as, sending a message at step 86. If the instructions call for sending a message at step 88 then at step 90 a message would be delivered and the communication will be terminated at step 94. However, if at step 86 it is determined that a message is not to be sent at step 92 then the connection will be permanently terminated at step 94.

It should be appreciated that during anytime of the interruption of the communication between the two devices either of the parties can terminate the phone call and the intelligent electronic device 23 will automatically be disabled upon sensing that the other cell phone is no longer in service or the communication has been deliberately terminated. This will of course occur when connectivity is restored and electronic device 23 seeking to resume connection discovers that the other party has terminated the communication, otherwise the electronic device 23 would continue to follow the pre-programmed instruction of either resuming connection or following the pre-determined subscriber, device or network based Instructions. This will be sensed, for example, when the communication device has been turned-off, or the other subscriber device has already established communication with another communication device and is no longer available, to name a few.

As stated earlier, once a call is established with a mobile cell phone, there are a number of possible reasons why the wireless communication channel may be temporarily or permanently interrupted or dropped. For example, it could be due to the mobile telephone traveling outside the coverage area, or due to the handoff to a cell with insufficient communication channels, or being in an area with a coverage hole, or a mobile switching center (MSC) error, or interference from other RF sources, to name a few.

The various embodiments of the present invention permit a traveler to survive call dropouts or interruption. The intelligent device 23 will use a number of different pieces of information to predict interruption, such as, for example, the use of historical data, geographical data, enhanced location data, topographical data, GPS, to name a few. Other embodiments will include, but not limited to, factoring in the capacity of neighboring cells in the above calculations.

This invention achieves more customer satisfaction; it will also enhance revenue for a wireless provider, since many dropped calls are not resumed. While it is probably not advantageous for a wireless provider to charge for the outage or the interrupted time, it will however be possible to resume billing when the call is picked-up again.

There are a variety of other useful embodiments on the present invention. For example, a user may key in some sequence for a call-back (the network will call both parties when connectivity returns), sending the notification on the signaling channel so that the cell phone can respond in a pre-configured way. Another embodiment may include a voice recorder in the cell phone so that one can dictate a message and have it sent as voice mail when connectivity is restored. This particular embodiment of the present invention will be particularly useful for travelers on airplanes. However, it is also possible for a subscriber to use predetermined messages or stopping the call before drop-off or interruption and dictating a message, which message will be delivered to the other device while the communication is being interrupted for one of the devices.

The present invention also provides an easy method and service for offline composition of voice messages or other communication, such as, for example, data, video, audio, to name a few. There are several embodiments of this feature, especially in the type of delivery: to the recipients' cell phone(s), to their voice mail, via email with a voice attachment, via a Web site with phone/email/pager notification, to name a few, or to any other communication device. Multiple recipients may be listed for each message or information; the list of the recipients can be resident either on the cell phone or in the network, or subscriber's own Internet host or at any other appropriate location. Upload can be at a low bit-rate; this will work better in low-signal environments, and can be combined with a live voice call. Upload of the messages or information can be either automatic or manually triggered. In another embodiment time delays or delivery times can also be specified. Confirmation can also be sent back to the caller's cell phone or any other designated device. This invention also allows the use of all of the features of current high-end voice mail systems.

In another embodiment of the present invention the cell phone will go on into a sleep mode while the call is interrupted and go into an active mode when the connectivity is resumed, thus reducing drain on the battery.

Thus this invention uses existing cellular type systems and networks and enhances the same. An exemplary communication system suitable for use with the process of the present invention may include several subscriber terminals 10 and 20 and a communication infrastructure. The communication infrastructure may include one or more base station transceivers ("base stations") and mobile switching center ("MSC"). The base station may communicate with the subscriber terminals 10 and 20 via radio frequency links according to any of the known air interface protocols, including those using FM, TDMA or CDMA communication techniques.

EXAMPLES

Various aspects of the present invention are further illustrated by referring to the following examples which are intended only to further illustrate the invention and are not intended to limit the scope of the invention in any manner.

Example 1

In one embodiment of the present invention the intelligent device 23 may monitor the path of a cell phone call, correlate it with map data (as many calls occur on well-traveled roads) and with dynamic customer data, such as effective signal strength (which in turn depends on antenna type, hand-held versus car-mount, etc.), and use this to predict and notify the parties of the impending interruption. Thus, instead of the call dropping, the intelligent device 23 may predict the call interruption. Therefore, assuming that a call interruption will last 37 seconds and that the intelligent device 23 has been set to make the announcement at 20 seconds prior to the interruption, then at 20 seconds before the outage both parties on the call will hear "This call is likely to be interrupted for 37 seconds. You may hang up now, or remain on the phone; the call will resume shortly". The "37 seconds" calculations can come from one or more sources, such as, distance data in the geobase the system's knowledge of average speed along that path, the motorist's speed along that path, road conditions, other customers who have driven that path recently, historical data, to name a few. Thus this invention allows the user to become aware of a call interruption prior to the anticipated interruption of the call.

Example 2

In another embodiment of the present invention a business traveler may have reached or be in the communication interruption zone. The business traveler using this invention will record a series of messages with the cell phone in a nonconnectivity or offline mode and when the traveler arrives at a connectivity point the traveler will turn-on the cell phone and the cell phone will send all or some of the previously recorded messages per the traveler's instructions. In another embodiment, a cell phone may be configured to send these previously recorded messages over a low-bandwidth, non-realtime channel, so that the system can upload while the person is conducting a normal voice call. This feature will be a way around congested cell sites, especially at airports, where multiple airline passengers are likely to use their cell phones at the same time once their flight lands.

The foregoing Detailed Description and the Examples are to be understood as being in every respect illustrative and exemplary, but not restrictive, and the scope of the invention disclosed herein is not to be determined from the Detailed Description or the Examples, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A method, comprising:
  determining, by a system comprising a processor, that a first communication device of communication devices has entered a dead zone area associated with a communication network via which the communication devices are coupled, wherein a communication session between the communication devices, via the communication network, is disconnected in response to the determining that the first communication device has entered the dead zone area;
  in response to the determining that the first communication device has entered the dead zone area, facilitating, by the system, a recording of a voice message via the first communication device during a time period that the first communication device is not coupled to a set of base station devices of the communication network; and
  in response to determining that the first communication device is coupled to a base station device of the set of base station devices, facilitating, by the system, a transmission of the voice message to a voice message server of the communication network associated with a second communication device of the communication devices.

2. The method of claim 1, further comprising:
  based analyzing historical data, determining, by the system, the dead zone area.

3. The method of claim 1, further comprising:
  facilitating, by the system, a termination of the communication session between the communication devices in response to the determining that the first communication device has entered the dead zone area.

4. The method of claim 1, further comprising:
  facilitating, by the system, a reestablishment of the communication session in response to determining that a reconnection attempt is to be made subsequent to the first communication device re-connecting to the base station device.

5. The method of claim 1, wherein the facilitating the transmission comprises facilitating the transmission in response to determining that the communication session between the communication devices is not reconnected within a specified number of attempts.

6. The method of claim 1, wherein the facilitating the transmission comprises facilitating the transmission to an email server of the communication network associated with the second communication device.

7. The method of claim 1, wherein the facilitating the transmission comprises facilitating the transmission by employing a bit-rate that satisfies a low bit-rate criterion.

8. The method of claim 1, wherein the communication session is a first communication session and the facilitating the transmission comprises facilitating the transmission concurrently with a second communication session associated with the first communication device.

9. The method of claim 8, wherein the facilitating the transmission comprises facilitating the transmission over a communication channel that is determined to satisfy a low bandwidth criterion.

10. The method of claim 1, wherein the voice message is a first voice message, the transmission is a first transmission and the method further comprises:
  facilitating, by the system, a second transmission of a second voice message to a network device of the communication network prior to the first communication device entering the dead zone area, wherein the second voice message is delivered to the second communication device during the time period.

11. The method of claim 10, further comprising:
  receiving, by the system, a message indicative of a cause of disconnection of the communication session, prior to the first communication device entering the dead zone area.

12. A first communication device, comprising:
  a non-transitory memory to store instructions; and
  a processor coupled to the non-transitory memory that facilitates execution of the instructions to perform operations, comprising:
    subsequent to an interruption of a communication session between the first communication device and a second communication device via a communication network, recording, via a voice recorder of the first communication device, an offline message associated with the communication session, wherein the voice recorder records the offline message in response to determining that the first communication device is disconnected from a set of base station devices of the communication network, and
    facilitating a transmission of the offline message to a voice message server of the communication network associated with the second communication device in response to a determination that the first communication device has reconnected with a base station device of the set of base station devices.

13. The first communication device of claim 12, wherein the transmission is a first transmission and the operations further comprise:
  facilitating a second transmission of the offline message to a network server of the communication network that is associated with the second communication device, wherein the network server employs a device notification service to facilitate a delivery of the offline message to the second communication device.

14. The first communication device of claim 12, wherein the communication session is a first communication session and the offline message is transmitted concurrently with a second communication session established between the first communication device and a third communication device.

15. The first communication device of claim 12, wherein the offline message is transmitted at a specified delivery time subsequent to the determination that the first communication device has reconnected with the communication network.

16. The first communication device of claim 12, wherein the offline message is a first message and the operations further comprise:

terminating the communication session prior to the first communication device being disconnected from the communication network, in response to the terminating, recording, a second message via the voice recorder, and directing the second message to the second communication device prior to the first communication device being disconnected from the communication network, wherein the second communication device facilitates a presentation of the second message during a time period that the first communication device is disconnected from the communication network.

17. The first communication device of claim 12, wherein the operations further comprise:

facilitating a reestablishment of the communication session via a first communication channel in response to the determination that the first communication device has reconnected with the communication network, wherein the offline message is transmitted over a second communication channel that satisfies a low bandwidth criterion.

18. The first communication device of claim 17, wherein transmission is a first transmission and the operations further comprise:

facilitating a second transmission of the offline message to an email server of the communication network that is associated with the second communication.

19. A non-transitory computer-readable storage device having instructions stored thereon that, in response to execution, cause a system comprising a processor to perform operations, comprising:

determining a disconnection of a first communication device from a first base station device of communication network, during a communication session between the first communication device and a second communication device via a set of network devices of the communication network;

in response to the determining, recording, via the first communication device, an offline message during a period that the first communication device is disconnected from the first base station device; and facilitating a transmission of the offline message to a voice message server of the communication network that is associated with the second communication device after the first communication device reconnects with a second base station device of the communication network.

20. The non-transitory computer-readable storage device of claim 19, wherein the communication session is a first communication session and the facilitating comprises facilitating the transmission concurrently with a second communication session between the first communication device and a third communication device via the set of network devices.

* * * * *